US012724483B2

(12) United States Patent
Mine et al.

(10) Patent No.: US 12,724,483 B2
(45) Date of Patent: Sep. 1, 2026

(54) CONTROL DEVICE AND CONTROL METHOD FOR CONTROLLING AN ELECTRONIC APPARATUS IN A PLURALITY OF CONTROL MODES

(71) Applicant: CANON KABUSHIKI KAISHA, Tokyo (JP)

(72) Inventors: Yosuke Mine, Tokyo (JP); Atsushi Sugawara, Kanagawa (JP); Shuichi Ohkawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/884,857

(22) Filed: Sep. 13, 2024

(65) Prior Publication Data

US 2025/0013302 A1 Jan. 9, 2025

Related U.S. Application Data

(63) Continuation of application No. PCT/JP2022/047208, filed on Dec. 21, 2022.

(30) Foreign Application Priority Data

Mar. 24, 2022 (JP) ................................ 2022-049042
Sep. 30, 2022 (JP) ................................ 2022-158875

(51) Int. Cl.

*G06F 3/01* (2006.01)
*G06F 3/0346* (2013.01)
*G06F 3/038* (2013.01)

(52) U.S. Cl.

CPC ........... *G06F 3/014* (2013.01); *G06F 3/0346* (2013.01); *G06F 3/038* (2013.01)

(58) Field of Classification Search

CPC .... G06F 3/005; G06F 3/01–014; G06F 3/017; G06F 3/0304; G06F 3/033;
(Continued)

(56) References Cited

U.S. PATENT DOCUMENTS 11,294,475 B1 * 4/2022 Pinchon ................ G06F 3/0338
2017/0185159 A1 * 6/2017 Murase .................. G06F 3/011
(Continued)

FOREIGN PATENT DOCUMENTS

JP 2015069481 A 4/2015
JP 2015228256 A 12/2015
(Continued)

OTHER PUBLICATIONS

Foreign Patent Documents #1-2 and 4-6 were cited in the International Search Report dated Feb. 28, 2023, of International Application No. PCT/JP2022/047208, a copy of which is enclosed with an English translation.

*Primary Examiner* — Keith L Crawley
(74) *Attorney, Agent, or Firm* — Cowan, Liebowitz & Latman, P.C.

(57) ABSTRACT

A control device controls an electronic apparatus. The control device selects either one of a first control mode and a second control mode as a control mode to control the electronic apparatus. The control device 1) controls the electronic apparatus in accordance with a state of a specific portion of the user determined based on imaging by an imaging unit in a case where the first control mode is selected, and 2) controls the electronic apparatus in accordance with an operation of the user involving a physical contact with a specific operation member in a case where the second control mode is selected. The specific operation member is included in a controller, and the controller is wearable on the hand of the user.

22 Claims, 11 Drawing Sheets

(58) Field of Classification Search
CPC ......... G06F 3/0346; G06F 3/038–0383; G06F 3/0481–04815; G06F 2203/0331; G06V 40/28; G06T 7/20; G06T 7/292; G06T 19/00–20; A63F 13/20–213; A63F 13/428; A63F 13/53
See application file for complete search history.

(56) References Cited

U.S. PATENT DOCUMENTS

| | | | | |
|---|---|---|---|---|
| 2019/0362557 | A1* | 11/2019 | Lacey | G06T 5/20 |
| 2020/0218423 | A1* | 7/2020 | Ohashi | G06F 3/04186 |
| 2020/0226814 | A1* | 7/2020 | Tang | G02B 27/017 |
| 2021/0090331 | A1* | 3/2021 | Ravasz | G06T 19/20 |
| 2021/0141444 | A1* | 5/2021 | Speelman | G06F 3/012 |
| 2021/0318759 | A1* | 10/2021 | Erivantcev | H04B 1/385 |
| 2021/0405760 | A1* | 12/2021 | Schoen | G06F 3/0304 |
| 2023/0401897 | A1* | 12/2023 | Liu | G06V 40/28 |

FOREIGN PATENT DOCUMENTS

| | | | |
|---|---|---|---|
| JP | 2017059062 | A | 3/2017 |
| JP | 2017117211 | A | 6/2017 |
| JP | 2018206080 | A | 12/2018 |
| WO | 2020110270 | A1 | 6/2020 |

* cited by examiner 301
302
303
A
B
C
RAY

START
S601
HAND IS IN CONTACT WITH OTP?
YES
NO
S602
HAND IS CAPTURED IN PREDETERMINED RANGE?
NO
YES
S503
SELECT OTP CONTROL MODE
S603
ANGLE Θ IS SMALLER THAN PREDETERMINED VALUE?
NO
YES
S504
SELECT RAY CONTROL MODE
S505
SELECT TRACKING CONTROL MODE
S506
ENABLE SELECTED CONTROL MODE
S507
END PROCESSING?
NO
YES
END

START
S901
OTP BUTTON PRESSED?
YES
S503
SELECT OTP CONTROL MODE
NO
S902
TRACKING CONTROL BUTTON PRESSED?
YES
NO
S903
RAY CONTROL BUTTON PRESSED?
NO
YES
S504
SELECT RAY CONTROL MODE
S505
SELECT TRACKING CONTROL MODE
S506
ENABLE SELECTED CONTROL MODE
S507
END PROCESSING?
NO
YES
END

CONTROL DEVICE AND CONTROL METHOD FOR CONTROLLING AN ELECTRONIC APPARATUS IN A PLURALITY OF CONTROL MODES

CROSS-REFERENCE TO RELATED APPLICATIONS

This application is a Continuation of International Patent Application No. PCT/JP 2022/047208, filed Dec. 21, 2022, which claims the benefit of Japanese Patent Application No. 2022-049042, filed Mar. 24, 2022 and Japanese Patent Application No. 2022-158875, filed Sep. 30, 2022, all of which are hereby incorporated by reference herein in their entirety.

BACKGROUND OF THE INVENTION

Field of the Invention

The present invention relates to a control device and a control method.

Background Art

A mixed reality (MR) technique and a virtual reality (VR) technique, which make a user feel a space different from a real space using a head-mounted display (HMD), are known. In such techniques, it has been considered that the user performs various controls for an HMD in a state of wearing the HMD.

PTL 1 discloses an information processing device which recognizes an input device and an operation medium (a hand of a user) which operates the input device, and selects an application in accordance with the recognized result. For example, in a case where a keyboard (input device) and a hand of the user are recognized, the information processing device starts up a text editor application which allows text input by operating a keyboard. In a case where a controller (input device) and a hand are recognized, on the other hand, the information processing device starts up an application to perform CG adjustment by operating the controller.

The information processing device according to PTL 1 selects an application to be started in a case where both an input device and an operation medium are recognized. This means that if the user controls such an electronic apparatus as an HMD without using the input device, for example, the information processing device cannot select an appropriate application. Hence in some cases the electronic apparatus may not be controlled in accordance with a control method desired by the user.

CITATION LIST

Patent Literature

PTL 1 Japanese Patent Application Publication No. 2017-059062

SUMMARY OF THE INVENTION

With the foregoing in view, it is an object of the present invention to provide a technique to allow controlling an electronic apparatus in accordance with a control method desired by the user.

An aspect of the present invention is a control device for controlling an electronic apparatus, including: one or more processors and/or circuitry configured to perform selection processing to select either one of a first control mode and a second control mode as a control mode to control the electronic apparatus; and perform control processing to 1) control the electronic apparatus in accordance with a state of a hand of a user determined based on imaging by an imaging device in a case where the first control mode is selected in the selection processing, and 2) control the electronic apparatus in accordance with an operation of the user involving a physical contact with a specific operation member in a case where the second control mode is selected in the selection processing, wherein the specific operation member is included in a controller, and the controller is wearable on the hand of the user.

Another aspect of the present invention is a method for controlling an electronic apparatus, including: a selection step of selecting either one of a first control mode and a second control mode as a control mode to control the electronic apparatus; and a control step of 1) controlling the electronic apparatus in accordance with a state of a hand of a user determined based on imaging by an imaging device in a case where the first control mode is selected in the selection step, and 2) controlling the electronic apparatus in accordance with an operation of the user, involving a physical contact with a specific operation member, in a case where the second control mode is selected in the selection step, wherein the specific operation member is included in a controller, and the controller is wearable on the hand of the user.

Further features of the present invention will become apparent from the following description of exemplary embodiments with reference to the attached drawings.

DESCRIPTION OF THE EMBODIMENTS

Figure 1:
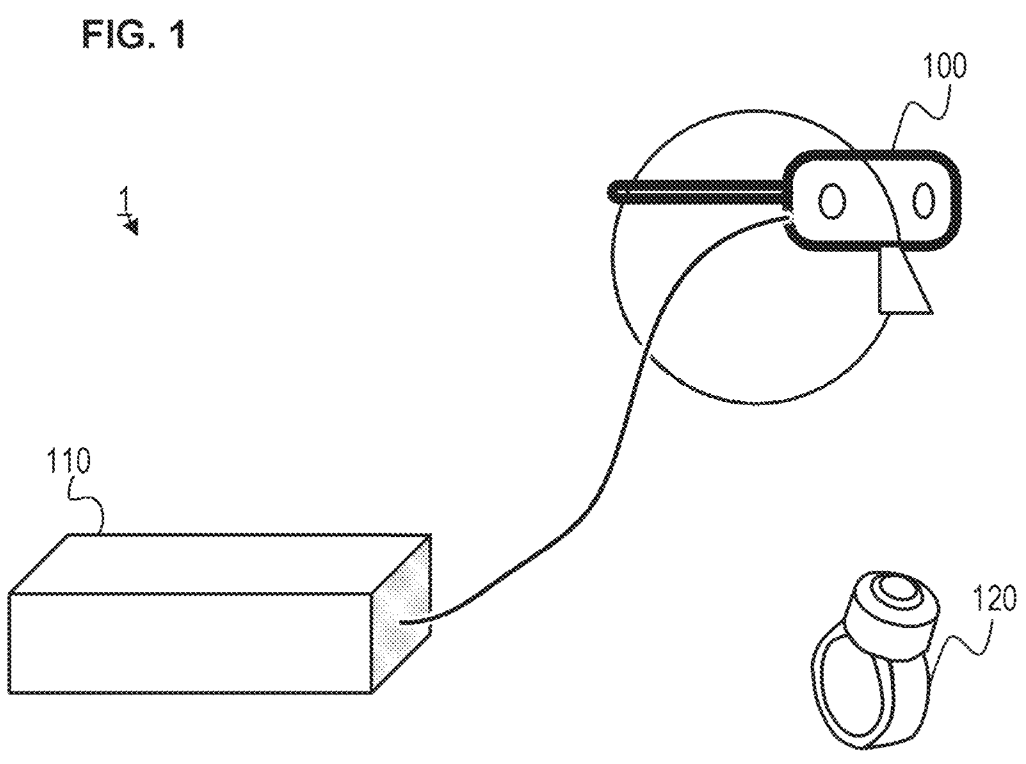
FIG. 1 is a diagram depicting an information processing system according to Embodiment 1.

Each embodiment will now be described with reference to the drawings. Same or similar composing elements, members or processing steps indicated in the drawings are denoted with a same reference sign, and redundant description will be omitted. In each drawing, a part of a composing element, member and processing will be omitted.

Embodiment 1

An information processing system 1 according to Embodiment 1 will be described with reference to FIG. 1. The information processing system 1 includes an HMD 100, an image processing device 110, and a controller 120.

The HMD 100 is a head-mounted type display device (electronic apparatus), which is mounted on the head of a user. A composite image composed of a captured image, which the HMD 100 captures the range in front of the user, and such content as computer graphics (CG) in a form in accordance with the attitude of the HMD 100, is displayed on the HMD 100.

The image processing device 110 is a control device (electronic apparatus) to control the HMD 100. For example, the image processing device 110 is a smartphone, a tablet terminal or a personal computer (PC). The image processing device 110 is connected to an HMD 100 via cable or wirelessly. The image processing device 110 generates a composite image by composing a captured image and a CG, and sends the composite image to the HMD 100. Each configuration of the image processing device 110 may be included in the HMD 100.

The controller 120 is a device to perform various controls of the HMD 100. If the image processing device 110 is in a specific control mode and the user operates the controller 120, the HMD 100 is controlled in accordance with the operation by the user. For example, the controller 120 has a ring shape, so as to be worn on a finger of the user, as illustrated in FIG. 1. If the controller 120 is wearable on the finger of the user like this, the user can freely move their hand while holding the controller 120. The controller 120 includes a button enclosing an optical trackpad (hereafter call OTP"). The controller 120 performs wireless communication with the image processing device 110 via Bluetooth.

For example, the user causes the HMD 100 to display a menu, including a pointer, by a lengthy pressing of the button of the OTP. Then by touching the OTP with a finger and sliding the finger in an arbitrary direction, the user can set the pointer on a desired item. Then by pushing the button of the OTP down, the user can perform a determination operation to determine the selection of this item. Here the shape of the controller 120 is a ring shape, but the shape is not limited to this. For example, the shape of the controller 120 may be a glove shape, which can be worn on the hand. Thus the controller 120 may be holdable by hand or wearable on the hand of the user, so that the user can use it easily.

The controller 120 may include any operation member, instead of the OTP, if the user can operate the member by physical contact. For example, the controller 120 may include a touchpad, a touch panel, a cross key, a joy stick or a trackpad device, instead of the OTP.

(Internal Configuration of HMD)

Figure 2:
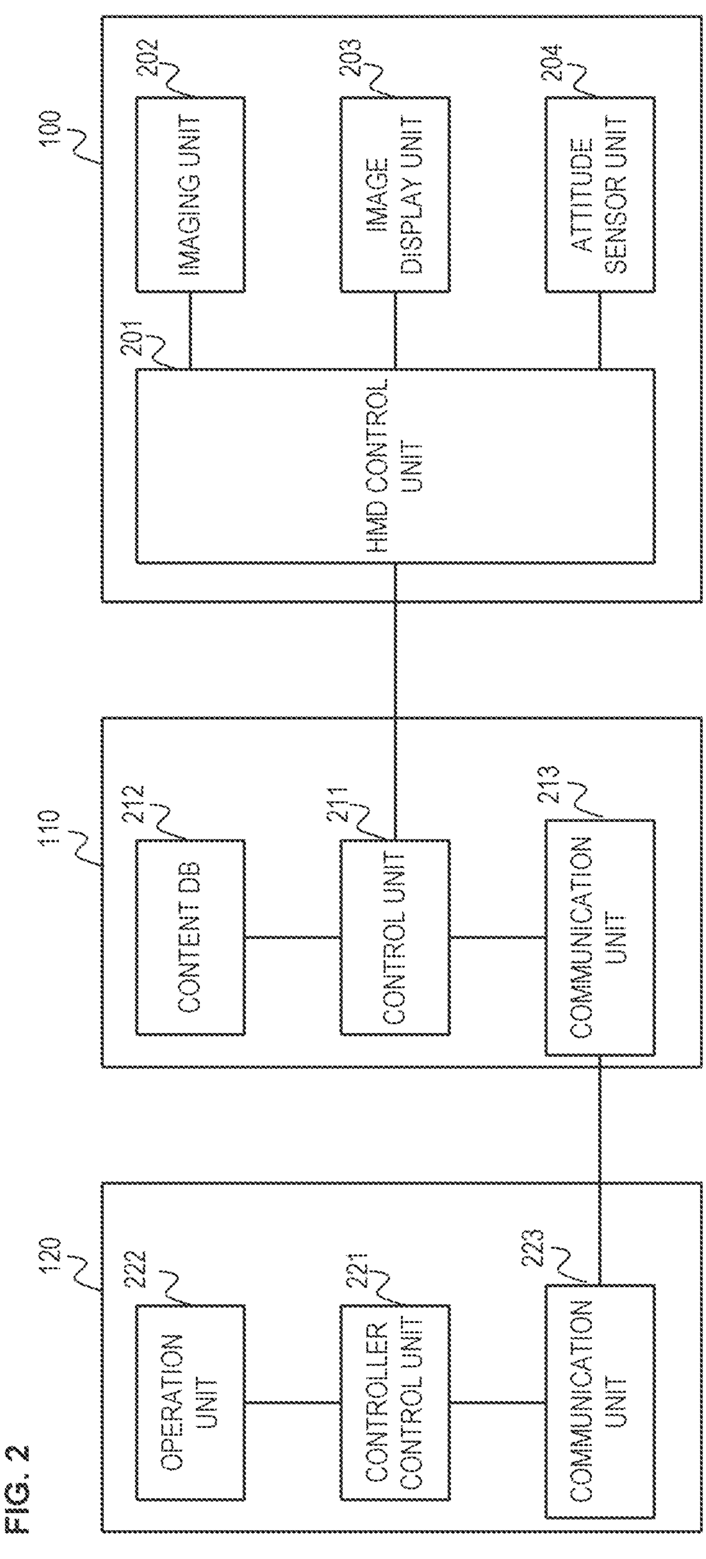
FIG. 2 is an internal block diagram of an HMD or the like according to Embodiment 1.

An internal configuration of the HMD 100 will be described with reference to FIG. 2. The HMD 100 includes an HMD control unit 201, an imaging unit 202, an image display unit 203, and an attitude sensor unit 204.

The HMD control unit 201 controls each composing element of the HMD 100. When the HMD control unit 201 acquires a composite image (image generated by composing a captured image which is an image of a space in front of the user captured by the imaging unit 202, and CG) from the image processing device 110, the HMD control unit 201 displays the composite image on the image display unit 203. Therefore the user wearing the HMD 100 can view the composite image displayed on the image display unit 203. The user can experience various mixed realities generated by integrating the CG in the real space.

The imaging unit 202 includes two cameras (imaging devices). To capture an image of a space similar to the space the user normally views, the two cameras are disposed near the positions of the left and right eyes of the user when the HMD 100 is worn. The images of a subject (range in front of the user) captured by the two cameras are outputted to the image processing device 110. The two cameras of the imaging unit 202 can acquire information on a distance from the two cameras to the subject as distance information, based on the distance measurement by a stereo camera.

The image display unit 203 displays the composite image. The image display unit 203 includes liquid crystal panels, organic EL panels, or the like, for example. In a state where the user is wearing the HMD 100, the organic EL panels are disposed in front of the eyes of the user respectively.

The attitude sensor unit 204 detects the attitude (and position) of the HMD 100. Then the attitude sensor unit 204 detects (acquires) the attitude of the user (user wearing the HMD 100) corresponding to the attitude (and position) of the HMD 100. The attitude sensor unit 204 includes an inertial measurement unit (IMU). The attitude sensor unit 204 outputs information on the attitude of the user (attitude information) to the image processing device 110.

(Internal Configuration of Image Processing Device)

An internal configuration of the image processing device 110 will be described with reference to FIG. 2. The image processing device 110 includes a control unit 211, a content DB 212, and a communication unit 213.

The control unit 211 receives the image (captured image) acquired by the imaging unit 202, and the attitude information acquired by the attitude sensor unit 204 from the HMD 100. The control unit 211 performs image processing on the captured image such that aberrations in an optical system of the imaging unit 202 and an optical system of the image display unit 203 are cancelled. Then the control unit 211 composes the captured image and an arbitrary CG, and generates a composite image thereby. The control unit 211 sends the composite image to the HMD control unit 201 of the HMD 100.

Further, based on the information (distance information and attitude information) acquired by the HMD 100, the control unit 211 controls the position, direction and size of the CG in the composite image. For example, in a case where a virtual object indicated by a CG is disposed near a specific object that exists in a real space in a space generated by the composite image, the control unit 211 increases the size of the virtual object (CG) as the distance between the specific object and the imaging unit 202 becomes shorter. By controlling the position, direction and size of the CG like this, the control unit 211 can generate a composite image as if the object of the CG, which is not disposed in the real space, were actually disposed in the real space.

The content DB 212 is a storage unit to store information on the CG and the like. The control unit 211 can select the CG that is read from the content DB 212 (that is, the CG used for generating the composite image).

(Internal Configuration of Controller)

An internal configuration of the controller 120 will be described with reference to FIG. 2. The controller 120 includes a controller control unit 221, an operation unit 222, and a communication unit 223.

The controller control unit 221 controls each composing element of the controller 120.

The operation unit 222 includes a button enclosing an OTP. Information on pressing or sliding of a finger on the OTP in the operation unit 222 is sent to the image processing device 110 via the communication unit 223.

For example, the user can move the pointer displayed on the HMD 100 to a desired position by sliding their finger on the OTP. Further, the user can instruct a specific processing to the HMD 100 or the image processing device 110 by pressing the button of the OTP. Thus the user can control the HMD 100 by a combination of sliding of the finger on the OTP and pressing the button of the OTP. For example, the user causes the HMD 100 to display a menu by a lengthy pressing of the button of the OTP, sets a pointer to a desired location, and then pushes the OTP button down, thereby this location can be selected.

The communication unit 223 performs wireless communication with the image processing device 110 (communication unit 213).

(Control Mode)

In the present embodiment, the image processing device 110 can implement control of the HMD 100 (e.g. control of selecting CG or moving the position of CG in the composite image displayed on the HMD 100) by using the following three modes (control methods).

A first control mode is a control mode in which the HMD 100 is controlled in accordance with the operation on the OTP of the controller 120 (operation involving physical contact of the user), as mentioned above (hereafter called "OTP control mode"). If the image processing device 110 is set to the OTP control mode, the control unit 211 controls the HMD 100 in accordance with the operation on the OTP by the user.

A second control mode is a control mode in which the HMD 100 is controlled using a virtual ray, which corresponds to the direction of the hand of the user (hereafter called "ray control mode"). If the image processing device 110 is set to the ray control mode, the control unit 211 controls the HMD 100 in accordance with the position of the virtual ray, which extends along the extended line of the direction of the hand of the user.

Figure 3:
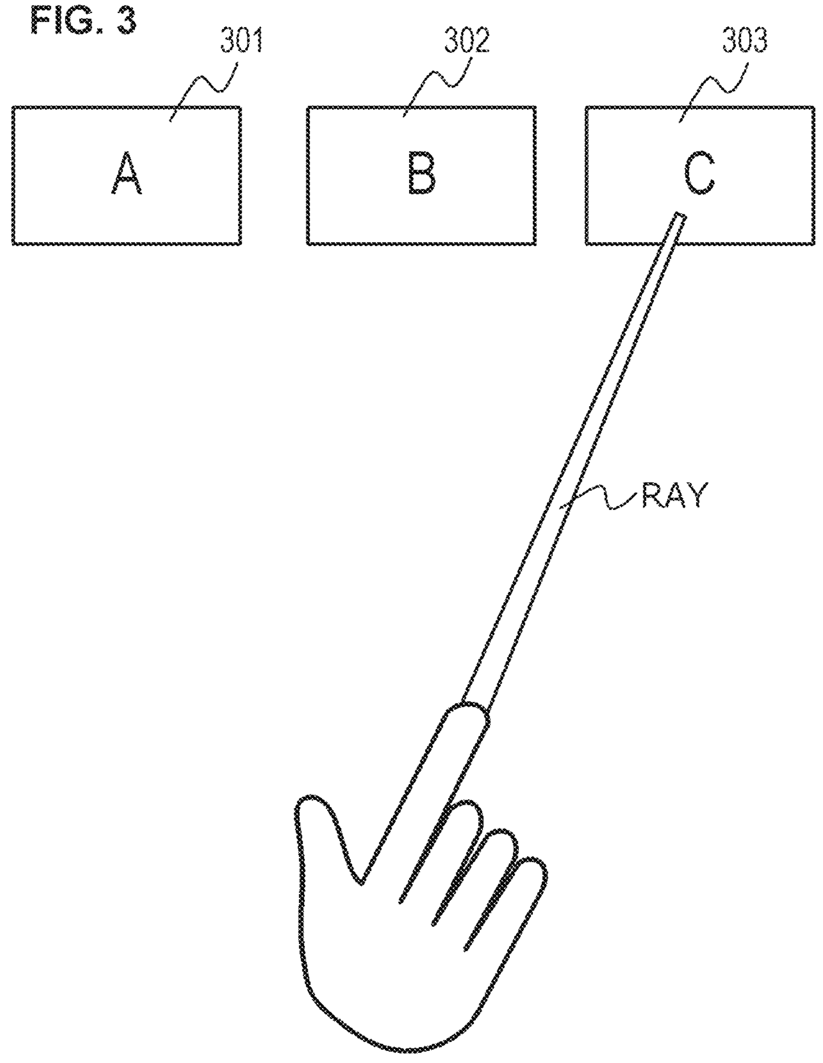
FIG. 3 is a diagram for describing a ray control mode according to Embodiment 1.

Specifically, in the ray control mode, the control unit 211 determines (recognizes) the direction of the hand of the user based on the color and shape of the hand of the user captured in the captured image. Here, as indicated in FIG. 3, the control unit 211 displays the CG of the ray, which extends in the direction pointed by the index finger, on the image display unit 203. Then the control unit 211 displays (moves) the pointer to a position to which the ray is directed. Hence the user can change the position and direction of the ray by changing the direction of the hand.

In the ray control mode, if the state of directing the ray to a specific display item continues longer than a predetermined time, for example, processing to determine to select the specific item indicated by the ray (determination processing) is executed. For example, if a menu panel (panel to display the menu) is constantly displayed on a corner of the screen of the image display unit 203, and the determination processing is performed in a state where the ray is directed to this panel, then a menu is displayed.

For example, in the ray control mode, the control unit 211 displays a composite image of the CGs of panels 301 to 303, which correspond to three choices respectively, as a menu, as illustrated in FIG. 3, on the composite image. Here if a state of the ray that is directed to one panel 303 continues longer than a predetermined time, the control unit 211 performs processing corresponding to the panel 303 to which the ray is directed.

The inertial measurement unit (IMU) disposed in the controller 120 worn on the hand of the user may be used for determining a direction pointed by the user. Specifically, based on both the information acquired by the IMU (information on the inclination and acceleration of the controller 120) and the information on the direction of the finger determined in an image, the control unit 211 may improve the matching rate of the direction pointed by the user and the extending direction of the ray.

A third control mode is a control mode in which the HMD 100 is controlled using hand tracking, which corresponds to the position of the hand of the user (hereafter called "tracking control mode"). If the image processing device 110 is set to the tracking control mode, the control unit 211 determines (recognizes) the position of the hand based on the direction, color and shape of the hand of the user captured in the captured image. Then the control unit 211 controls the HMD 100 in accordance with the position of the hand (specifically, the distance between the hand and the CG) in the space indicated by the composite image.

Figure 4:
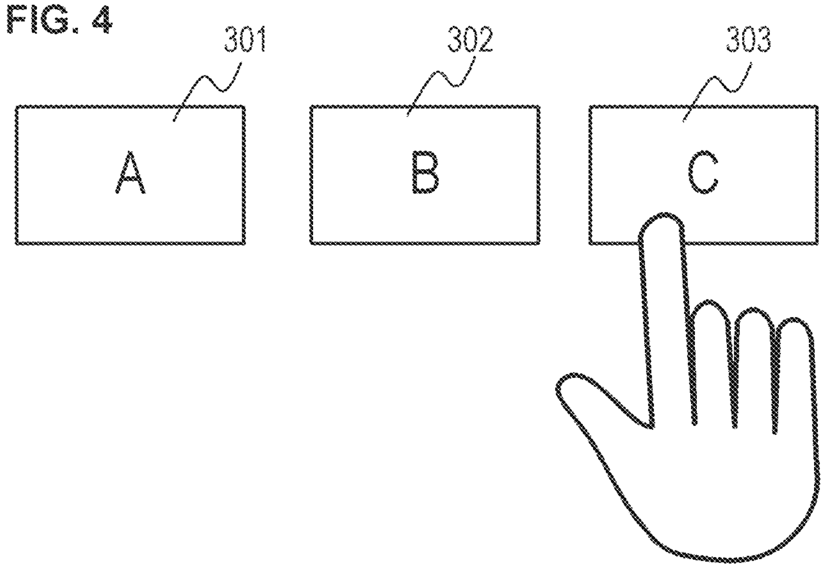
FIG. 4 is a diagram for describing a tracking control mode according to Embodiment 1.

For example, as illustrated in FIG. 4, the control unit 211 displays the CGs of the panels 301 to 303, which correspond to the three choices respectively, on the composite image, and calculates the distance between the three panels 301 to 303 and the fingertip of the index finger of the hand in the space indicated by the composite image. If the state where the distance between one of the three panels 301 to 303 and the fingertip is the predetermined distance or less continues longer than a predetermined time, the control unit 211 determines that this panel is selected. Then the control unit 211 performs determination processing corresponding to the selected panel. In the tracking control mode, just like the ray control mode, the menu panels (panels for displaying the menus) are displayed on the corner of the screen of the image display unit 203.

Each of the three modes have an advantage and a disadvantage. For example, in the control modes in which control corresponding to the state of the hand (state of the hand determined based on the captured image) is performed (in the case of the ray control mode and the tracking control mode), the user can perform quick control intuitively. However in these control modes, the hand must be kept at a certain height at all times, since the hand must be included in the image capturing range. Therefore the ray control mode and the tracking control mode are not appropriate for longtime control. In the OTP control mode, on the other hand, the user can control the HMD 100 in a state of their hand being lowered, although control is not so quick. In other words, in the OTP mode, stable control by the user can be expected even if the control time extends for a long time.

The ray control mode, in which the HMD 100 can be controlled in accordance with the ray, is convenient in a case of selecting a display item (panel), of which the distance from the hand is long. The tracking control mode, on the other hand, is convenient in a case of selecting a display item (panel) of which distance from the hand is short.

As described above, an appropriate scene to be used is different among the three control modes. Therefore if a control mode, to control the HMD 100, is appropriately switched (selected) among these control modes, user friendliness can be improved.

(Mode Selection Processing)

Figure 5:
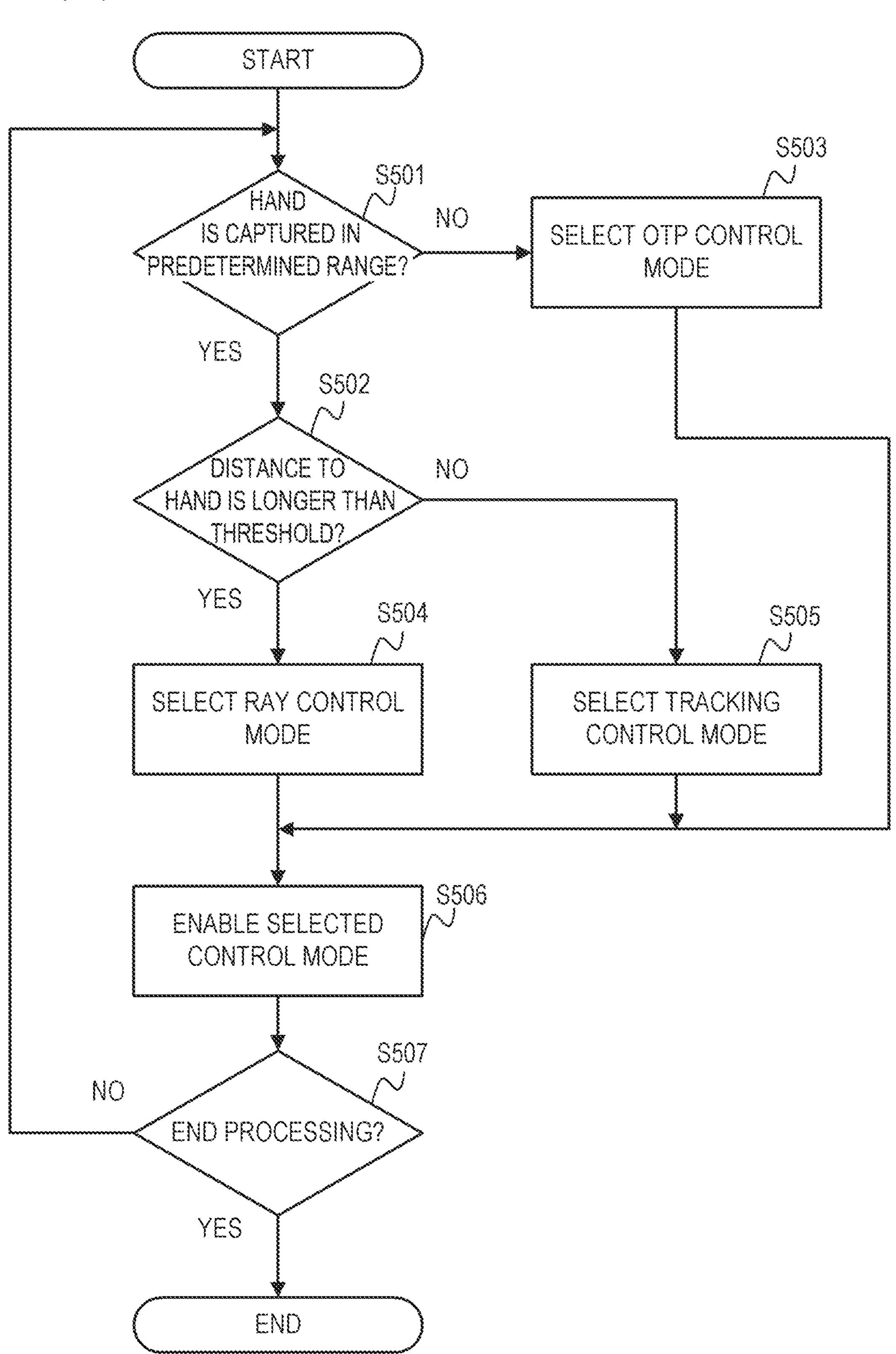
FIG. 5 is a flow chart of mode selection processing according to Embodiment 1.

A mode selection processing, to select a control mode to be used for controlling the HMD 100, among the three control modes (operation modes), will be described with reference to the flow chart in FIG. 5. When a user starts using the HMD 100, the processing of this flow chart starts. The flow chart in FIG. 5 is implemented by the control unit 211 (e.g. processor) executing a program.

In step S501, the control unit 211 determines whether a hand of the user is captured in a predetermined range of a captured image (a view angle of the camera of the imaging unit 202: imaging range). Processing advances to step S502 if the hand of the user is captured in the predetermined range. Processing advances to step S503 if the hand of the user is not captured in the predetermined range. The predetermined range here is an entire range of the captured image (imaging range), for example. However in a case where the hand is only partially captured at the edge of the captured image, it may become difficult to determine the shape, and the like, of the hand. Therefore the predetermined range may be a range that is slightly inside the captured image, where the hand can be sufficiently captured. The predetermined range may, for example, also be a range that is fixed with reference to the position of the face of the user.

In step S502, the control unit 211 calculates the distance from the imaging unit 202 (HMD 100) to the hand of the user by measuring the distance using the stereo cameras of the two cameras of the imaging unit 202. Then the control unit 211 determines whether the distance from the imaging unit 202 to the hand of the user is longer than a threshold Th (whether the hand of the user is distant from the HMD 100 more than the threshold Th).

Generally if the user wants to perform control using the ray, the user will tend to move their hand forward to point to a target. In other words, the position of the hand of the user tends to become relatively distant from the user. Therefore in the case where the distance from the imaging unit 202 to the hand of the user is longer than the threshold Th, processing advances to step S504 to select the ray control mode, since it is more likely that the user is pointing their finger to a far position that is distant from the user. In the case where the distance from the imaging unit 202 to the hand of the user is the threshold Th or less, on the other hand, processing advances to step S505 to select the tracking control mode, since it is more likely that the user is selecting a position close to the user by moving their hand toward that position.

The range where the hand of the user reaches varies, depending on the individual. Hence the control unit 211 may set the threshold Th in step S502 in accordance with the length of the arm of the user input in advance, so that the threshold Th is set to a value appropriate for the individual. In this case, the control unit 211 increases the value of the threshold Th as the length of the arm of the user is longer. For example, the control unit 211 multiplies the length of the arm of the user by a predetermined value (e.g. 0.8), and sets this value as the threshold Th.

The HMD 100 may include (use) a time-of-flight (ToF) sensor to measure the distance from the imaging unit 202 to the hand of the user. Further, the control unit 211 may estimate the distance from the imaging unit 202 to the hand of the user based on the size of the hand captured in the captured image.

In step S503, the control unit 211 selects the OTP control mode (control mode by the OTP using the controller 120) as the control mode to control the HMD 100.

In step S504, the control unit 211 selects the ray control mode as the control mode to control the HMD 100.

In step S505, the control unit 211 selects the tracking control mode as the control mode to control the HMD 100.

In step S506, the control unit 211 enables a control mode selected in steps S503 to S505. In other words, when the user performs an action (operation) corresponding to the selected control mode, the control unit 211 controls the HMD 100 (display on the image display unit 203) in accordance with this action (operation). Further, the control unit 211 disables the control modes other than the selected control mode. For example, if the OTP control mode is selected, the control unit 211 controls the HMD 100 in accordance with the operation on the OTP, and does not control the HMD 100 in accordance with the shape or the position of the hand of the user. The control unit 211 may display a different user interface (UI) on the image display unit 203 in accordance with the enabled control model. The control unit 211 may display a display item to recognize the enabled control mode (e.g. text indicating the name of the control mode) on the image display unit 203.

In step S507, the control unit 211 determines whether processing to end the operation of the HMD 100 is performed. For example, if the power button of the HMD 100 is pressed, the processing to end the operation of the HMD 100 is performed. If it is determined that the processing to end the operation of the HMD 100 is not performed, processing returns to step S501. If it is determined that the processing to end the operation of the HMD 100 is performed, processing of the flow chart ends, and the operation of the HMD 100 ends.

The state of the hand of the user (whether or not the hand of the user is captured in a predetermined range of the image, and the distance from the imaging unit 202 to the hand of the user) tends to indicate the intention of the user on how the user wants to control the HMD 100. Therefore according to Embodiment 1, the control mode conforming to the intention of the user can be selected, and the HMD 100 can be controlled in the control mode conforming to the intention of the user. As a consequence, user friendliness of the control of the HMD 100 can be improved.

Further, by disabling the unselected control modes, the processing required for the image processing device 110 can be decreased, hence the reduction in power consumption by the image processing device 110 can be expected. For example, in the case where the OTP control mode is disabled, the image processing device 110 may be controlled to not communicate with the controller 120.

The processing in each step of the flow chart in FIG. 5 is executed by the control unit 211 in the above description, but the processing in each step may be executed by the HMD control unit 201 of the HMD 100.

In the case where it is determined in step S501 that the hand of the user is captured in the predetermined range, the processing in step S504 or S505 may be performed without performing the processing in step S502. For example, in the case where it is determined in step S501 that the hand of the user is captured in the predetermined range, the control unit 211 may select a control mode that the user set in advance, out of the ray control mode and the tracking control mode.

Embodiment 2

An information processing system 1, which selects (switches) a control mode of the HMD 100 according to Embodiment 2, will be described with reference to FIG. 6. In Embodiment 2, the mode selection processing is different from Embodiment 1, hence this mode selection processing will be described below.

Figure 6:
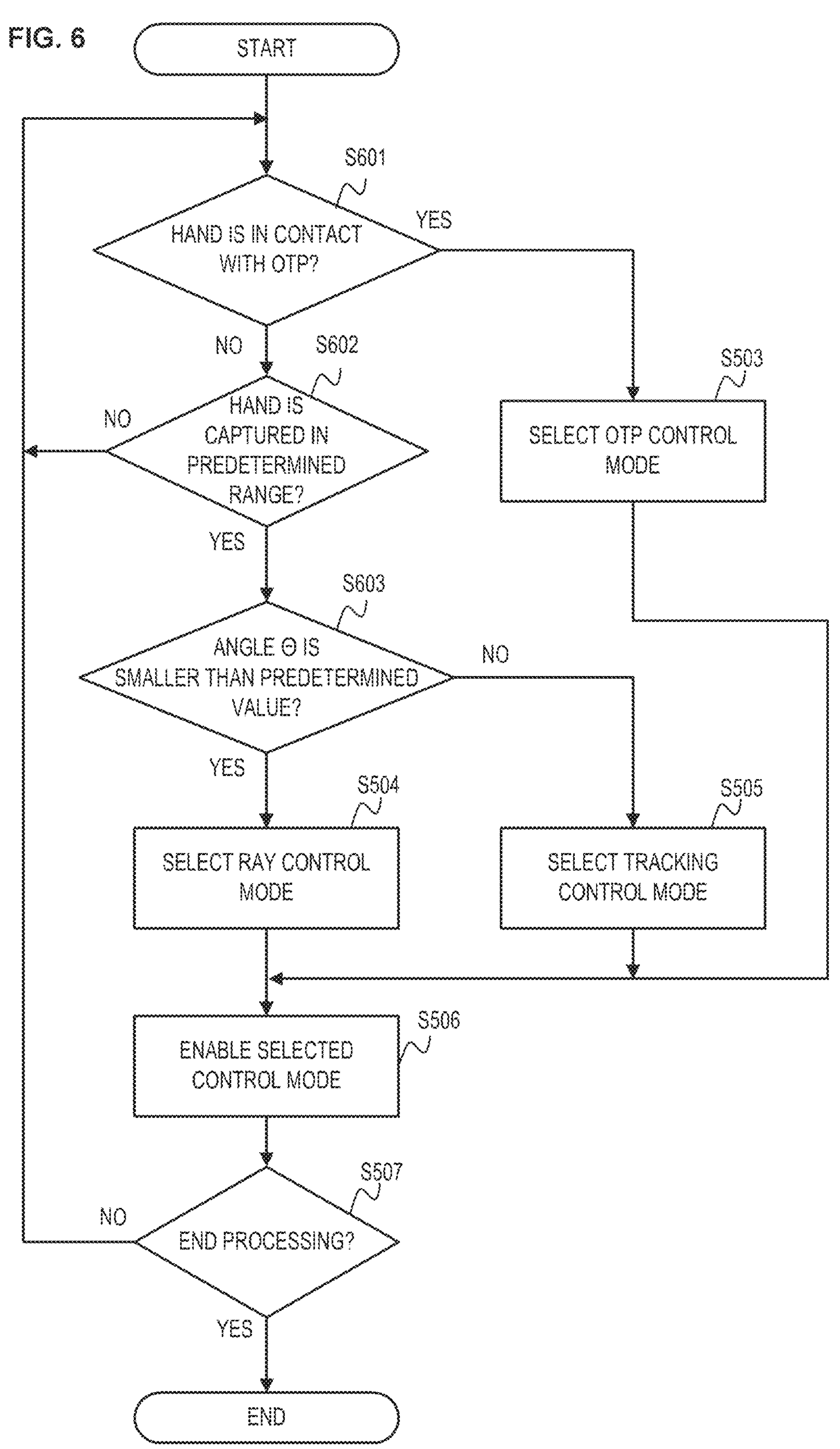
FIG. 6 is a flow chart of mode selection processing according to Embodiment 2.

The processing in the flow chart in FIG. 6 is different from the flow chart in FIG. 5 only in steps S501 and S502. Hence processing in only steps S601 to S603, which are performed instead of the steps S501 and S502, will be described below.

In step S601, the control unit 211 determines whether the hand of the user is in contact with the OTP of the controller 120. If it is determined that the hand of the user is in contact with the OTP, it is probably because the user is preparing for operating the OTP, hence processing advances to step S503. If it is determined that the hand of the user is not in contact with the OTP, processing advances to step S602.

In step S602, the control unit 211 determines whether the hand of the user is captured in a predetermined range of a captured image (a view angle of the camera). If it is determined that the hand of the user is not captured in the predetermined range, processing returns to step S601, since control that requires imaging of the hand (control using ray or hand tracking methods) cannot be performed. If it is determined that the hand of the user is captured in the predetermined range, processing advances to step S603.

Figure 7:
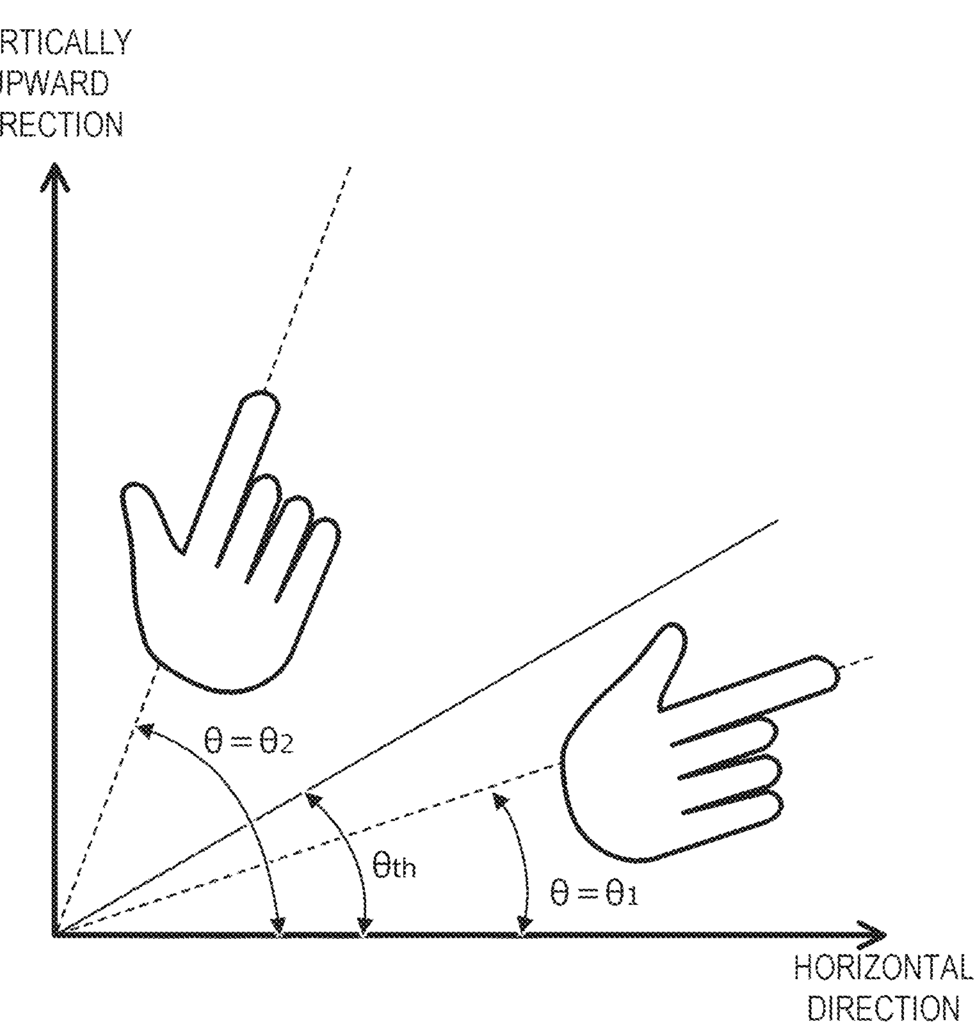
FIG. 7 is a diagram for describing a method for selecting a control mode according to Embodiment 2.

In step S603, the control unit 211 determines whether the angle θ, between a direction pointed to by the finger of the user and the horizonal direction (horizontal plane), is larger than a threshold θth (see FIG. 7). Processing advances to step S504 to select the ray control mode if the angle θ is smaller than the threshold θth. Processing advances to step S505 to select the tracking control mode if the angle θ is the threshold θth or more. In other words, as illustrated in FIG. 7, processing advances to step S504 in the case of angle θ=θ1, since the angle θ is smaller than the threshold θth. Processing advances to step S505 in the case of angle θ=θ2, since the angle θ is the threshold θth or more.

Generally in a case where the user desires to perform control using the ray, the user moves their hand forward to point to a target, such as a choice option. As a result, their finger tends to point forward in a direction close to the horizontal direction. In other words, when the user desires to perform control using the ray control mode, the angle θ tends to be small. On the other hand, in a case where the user desires to perform control using hand tracking, the direction pointed to by their finger tends to be relatively closer to the upper vertical direction of the user, compared with the case of control using the ray, as illustrated in FIG. 4. In other words, in the case where the user desires to perform control using hand tracking, the angle θ tends to be large.

Therefore if the control mode is selected in accordance with the size of the angle θ, the control mode desired by the user can be appropriately selected. This makes it possible for the control unit 211 to control the HMD 100 using the control method desired by the user.

In the above description, the control unit 211 switches the control mode by comparing the angle θ between the horizontal direction and the direction pointed to by the finger of the user with the threshold θth. However the control unit 211 may change the threshold θth depending on the conditions. For example, the attitude sensor unit 204 can detect a degree of the user bending forward/backward (inclination of the upper body of the user), hence the control unit 211 may determine the threshold θth based on the inclination of the upper body of the user each time the processing in step S602 is performed. For example, the control unit 211 decrease the threshold θth the more the user bends forward.

The state of the hand of the user (whether or not the hand of the user is in contact with the OTP, and the angle between the direction pointed to by the finger of the user and the horizontal direction) tends to indicate the intention of the user on how the user wants to control the HMD 100. Therefore according to Embodiment 2, the information processing system 1 can select the control mode desired by the user even more appropriately by determining whether the user is in contact with the OTP, and the angle between the direction pointed to by the finger of the user and the horizontal direction.

In the case where it is determined that the hand of the user is not in contact with the OTP in step S601, processing may advance to step S603, instead of the step S602. Further, in step S601, the control unit 211 may determine whether the hand of the user is open (at least one finger of the hand of the user is not bent) or closed. Whether the or not the hand of the user is open can be determined by analyzing the captured image, and/or detecting whether the hand is in contact with an outer periphery of the ring of the controller 120. If it is determined that the hand of the user is closed (all the fingers of the hand of the user are bent), processing advances to step S503, since it is unlikely that control by the ray or the tracking will be performed. If it is determined that the hand of the user is open (at least one finger of the hand of the user is not bent), processing advances to step S602. “Hand is open” may be interpreted as “the index finger is not bent”, and “hand is closed” may be interpreted as “the index finger is bent”.

Embodiment 3

An information processing system 1 which selects (switches) a control mode of the HMD 100 according to Embodiment 3, will be described with reference to FIG. 8. In Embodiment 3, the mode selection processing is different from Embodiments 1 and 2, hence this mode selection processing will be described below with reference to FIG. 8.

Figure 8:
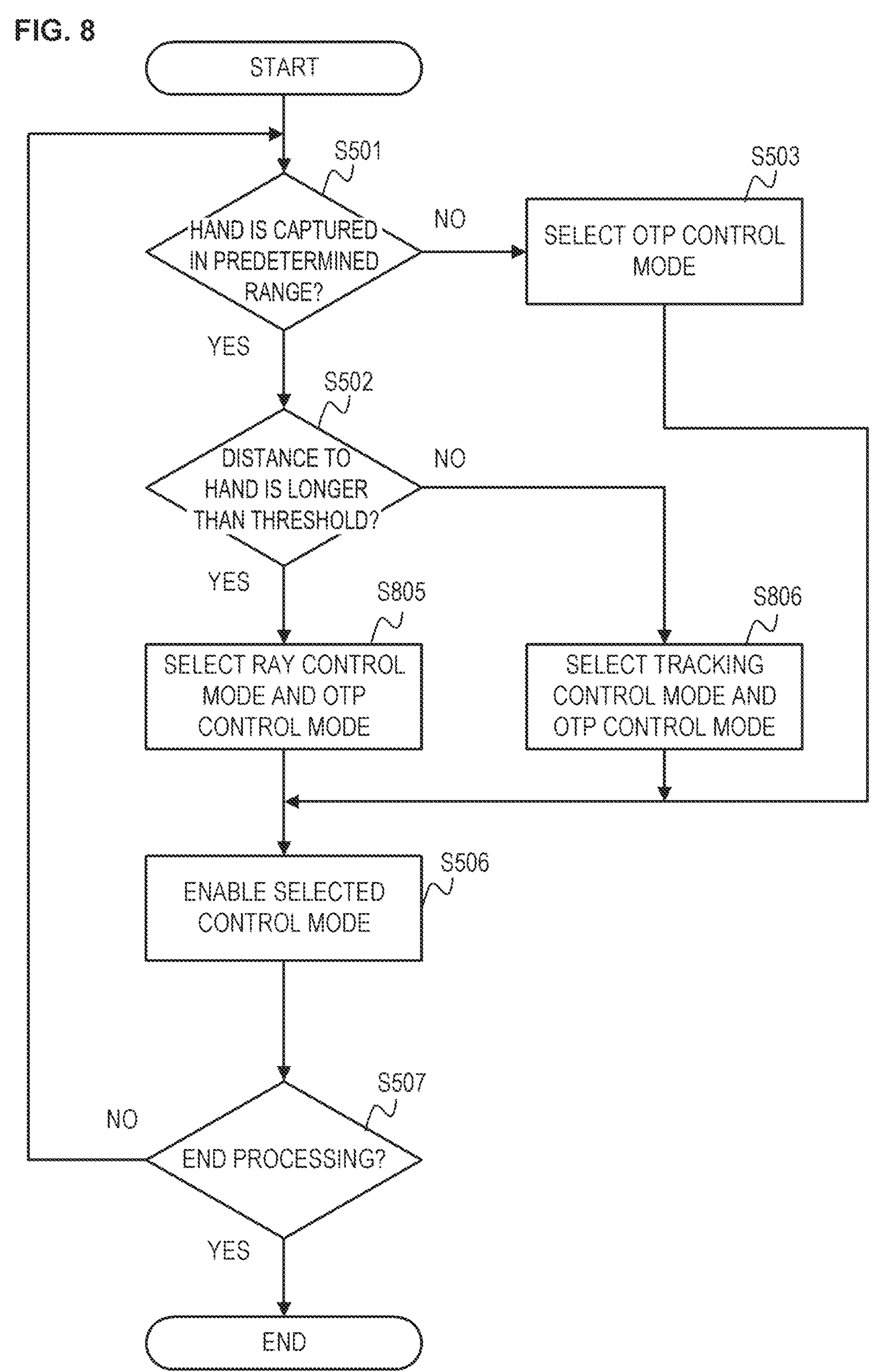
FIG. 8 is a flow chart of mode selection processing according to Embodiment 3.

The processing in the flow chart in FIG. 8 is different from the flow chart in FIG. 5 only in steps S805 and S806. Hence only processing in steps S805 and S806 will be described.

In Embodiments 1 and 2, the information processing system 1 selects one of the OTP control mode, the ray control mode and the tracking control mode to control the HMD 100. In Embodiment 3, on the other hand, the information processing system 1 selects a plurality of control modes as control modes used for controlling the HMD 100.

In step S805, the control unit 211 selects the ray control mode, just like step S504, and selects the OTP control mode at the same time. Thereby in step S506, the control of operation of the HMD 100 using the ray and the control of operation of the HMD 100 using the OTP are enabled simultaneously. For example, if the control of the pointer is enabled by using the ray and the OTP simultaneously, the pointer is directed to a general position by the ray using the left hand, and the position can be finely adjusted by the ring type controller 120 worn on the finger of the right hand.

In step S806, the control unit 211 selects the tracking control mode and the OTP control mode simultaneously. Thereby in step S506, both control of the operation of the HMD 100 using the hand tracking and control of the operation of the HMD 100 using the OTP are enabled simultaneously.

Thus in Embodiment 3, the information processing system 1 selects the OTP control mode simultaneously if the ray control mode or the tracking control mode is selected. In other words, in step S805, a control mode, in which both the control using the ray and the control using the OTP are enabled, is selected, and in step S806, a control mode, in which both the control using the hand tracking and control using the OTP are enabled, is selected. In Embodiment 3, the OTP control mode is always enabled, hence the information processing system 1 can always control the HMD 100 in accordance with the operation on the OTP.

Instead of the ray control mode or the tracking control mode, a control mode, in which the HMD 100 is controlled in accordance with a combination of bent fingers (or unbent fingers) out of the five fingers of the hand in the captured image, may be used. Further, instead of the ray control mode and the tracking control mode, in which the HMD 100 is controlled in accordance with a state of the hand, a control mode, in which the HMD 100 is controlled in accordance with a state of another specific portion of the user, may be used. For example, a control mode, in which the HMD 100 is controlled in accordance with the position and movement of the forearm of the user, may be used. In the case of using the control mode in which the HMD 100 is controlled in accordance with the position and movement of the forearm of the user, the control unit 211 selects this control mode if the forearm is captured by the imaging unit 202 (if the forearm is captured in the captured image), for example. If the forearm is not captured by the imaging unit 202, on the other hand, the control unit 211 selects the OTP control mode.

Furthermore, a control mode, in which the HMD 100 is controlled in accordance with a number of times of blinking of the eyes in a predetermined time, may be used. For example, in the case of using the control mode in which the HMD 100 is controlled in accordance with a number of times of blinking of the eyes in the predetermined time, the control unit 211 selects this control mode if both eyes of the user are captured by the imaging unit to capture the images of the eyes (an imaging unit different from the imaging unit 202). If both eyes of the user are not captured by this imaging unit, on the other hand, the control unit 211 selects the OTP control mode.

Embodiment 4

An information processing system 1, which selects (switches) a control mode of the HMD 100 according to Embodiment 4, will be described. The controller 120 here may include a plurality of buttons (not illustrated). A control mode linked to each button may be selected by the user pressing a button. For example, the controller 120 includes three buttons, and the image processing device 110 selects one of the OTP control mode, the ray control mode and the tracking control mode in accordance with the pressed button. In Embodiment 4, the mode selection processing is different from Embodiments 1 to 3, hence this mode selection processing will be described below with reference to FIG. 9.

Figure 9:
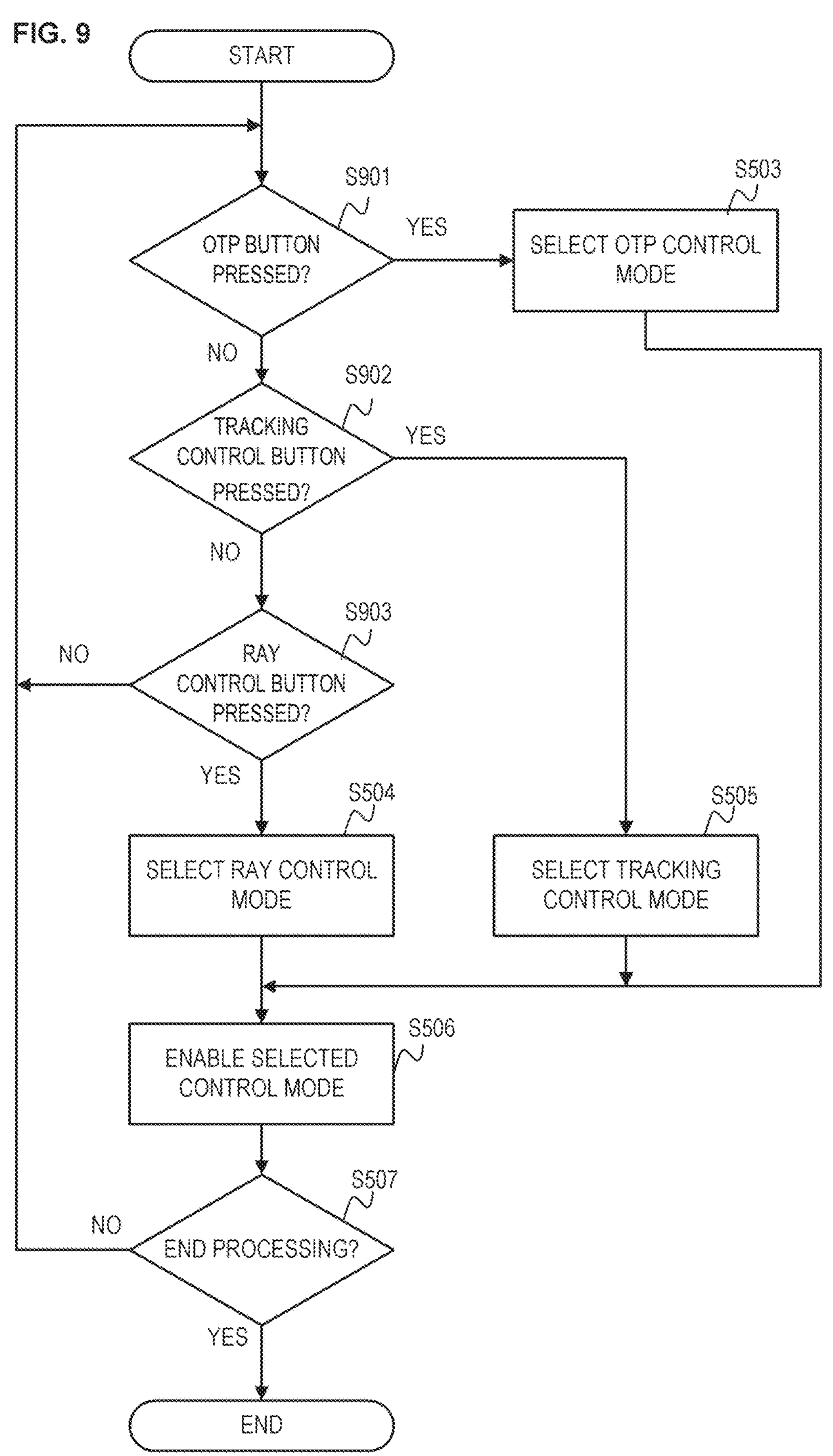
FIG. 9 is a flow chart of mode selection processing according to Embodiment 4.

The processing in the flow chart in FIG. 9 is different from the flow chart in FIG. 6 only in steps S601 to S603. Hence only processing in steps S901 to S903, which are performed instead of the steps S601 to S603, will be described below.

In step S901, the control unit 211 determines whether the OTP button of the controller 120 is pressed. Processing advances to step S503 if it is determined that the OTP button is pressed, since it is likely that the user is about to perform an operation using the OTP. Processing advances to step S902 if it is determined that the OTP button is not pressed.

In step S902, the control unit 211 determines whether a tracking control button (not illustrated) of the controller 120 is pressed. Processing advances to step S505 if it is determined that the tracking control button is pressed. Processing advances to step S903 if it is determined that the tracking control button is not pressed.

In step S903, the control unit 211 determines whether a ray control button (not illustrated) of the controller 120 is pressed. Processing advances to step S504 if it is determined that the ray control button is pressed. Processing returns to step S901 if it is determined that the ray control button is not pressed, since selecting an appropriate control mode is difficult.

In Embodiment 4, after the user selects a control mode by pressing a certain button once, the control unit 211 maintains the selected control mode until another button is pressed. For example, once the OTP button is pressed and the OTP control mode is selected, the OTP control mode is not cancelled even if the OTP button is released thereafter. An example of selecting the OTP control mode by pressing the OTP button was described here, but the OTP control mode may be selected by the finger of the user contacting the OTP.

In the example described in Embodiment 4, the controller 120 includes buttons which are linked to each mode respectively, but a number of buttons to select a mode may be one. In this case, the control mode to be selected may be changed each time the button is pressed. Further, the controller 120 may include two buttons: a button for changing the control mode in the forward direction (in a specific sequence) each time this button is pressed; and a button for changing the control mode in the opposite direction each time this button is pressed.

Embodiment 5

An information processing system 1, which selects (switches) a control mode of the HMD 100 according to Embodiment 5, will be described. In Embodiment 5, the mode selection processing is different from Embodiments 1 to 4, hence this mode selection processing will be described below with reference to FIG. 10.

Figure 10:
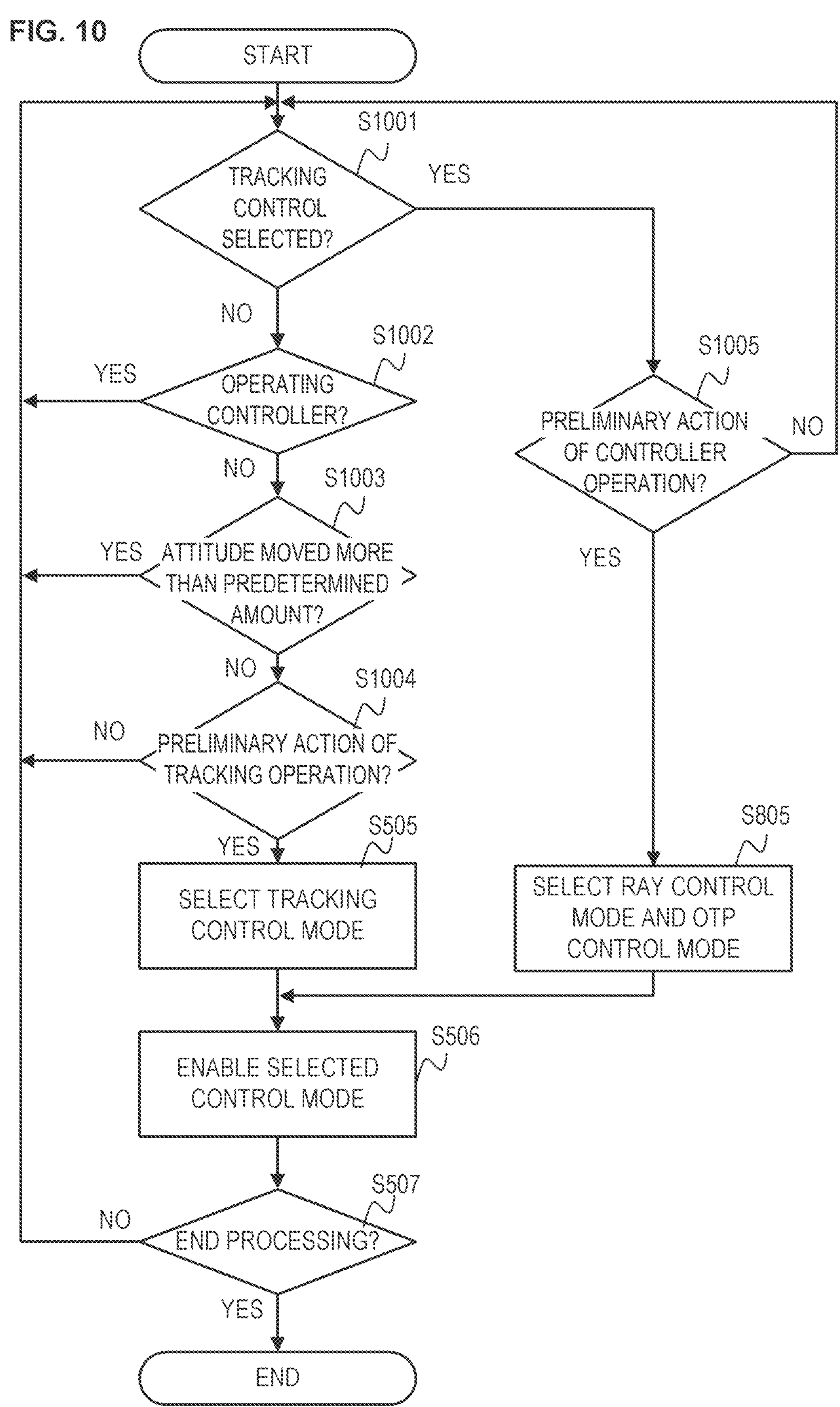
FIG. 10 is a flow chart of mode selection processing according to Embodiment 5.

The processing in the flow chart in FIG. 10 is different from the flow chart in FIG. 5 only in steps S501 to S504. Hence only processing in steps S1001 to S1005 and S805, which are performed instead of the steps S501 to S504, will be described. Description on the processing in step S805 will be omitted, since this is the same as the processing in step S805 in FIG. 8.

In Embodiment 5, the information processing system 1 selects one of two types as the control mode used for controlling the HMD 100: the tracking control mode; and a mode of using both the ray control mode and the OTP mode.

In step S1001, the control unit 211 determines whether the tracking control mode is selected at the present time (current point) as the control mode. Processing advances to step S1005 if it is determined that the tracking control mode is selected. Processing advances to step S1002 if it is determined that the tracking control mode is not selected.

In step S1002, assuming that the ray control mode and the OTP control mode are selected, the control unit 211 determines whether the user is currently operating the controller 120. For example, the control unit 211 can determine that the controller is currently being operated if the OTP is currently in-operation, the OTP button is pressed, or a button (not illustrated) of the controller 120 is pressed. If it is determined that the controller is currently being operated, processing returns to step S1001, since changing the control mode is not desirable (maintaining the current control mode is desirable). If it is determined that the controller is not currently being operated, processing advances to step S1003, since changing the control mode may cause no problem.

In step S1003, the control unit 211 determines whether the attitude change amount of the imaging unit 202 within a predetermined time is a predetermine value or more (whether the attitude of the imaging unit 202 has changed by the predetermined value or more), in order to prevent the unintended change of the control mode caused by the change of the attitude of the user. For this determination, the control unit 211 calculates the change amount of the attitude information acquired from the attitude sensor unit 204 within a predetermined time, compares this change amount with a predetermined value. For example, it is assumed that A0 is the attitude information at a timing before the predetermined time, A1 is the attitude information at the current timing, and T is the predetermined value. In this case, A1-A0 is the attitude change amount within the predetermined time, and the above determination can be performed by comparing this attitude change amount with T. The attitude information may be angle information in the polar coordinate system centered around the HMD 100, or a three-dimensional positional information in the orthogonal coordinate system. In the above example, a simple subtraction is used to calculate the change amount, but Euclidian distance may be calculated. If it is determined that the attitude change amount within the predetermined time is the predetermined value or more, processing returns to step S1001, since it is likely that the user does not intend to change the control mode. If it is determined that the attitude change amount within the predetermined time is less than the predetermined value, processing advances to step S1004.

In step S1003, in step S1003, as a method for determining whether the attitude change of the user is large, an example of comparing with the predetermined value was described. However, the control unit 211 may determine whether or not the attitude change of the user is large, by inputting the attitude information of the user and/or an image by which the attitude of the user can be determined into a model which has been pre-trained by machine learning. In other words, in step S1003, any method may be used if it is possible to determine a predetermined change of the attitude of the user (imaging unit 202).

Figure 11A:
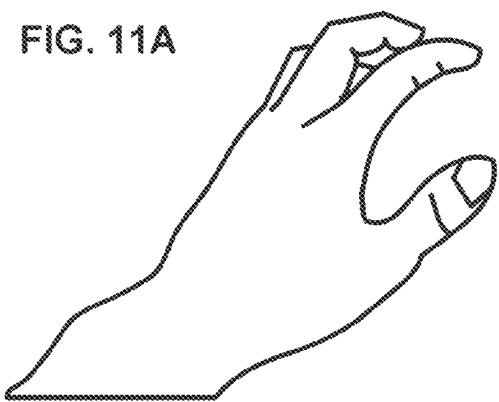
FIG. 11A and FIG. 11B are conceptual diagrams for describing preliminary actions according to Embodiment 5.
Figure 11B:
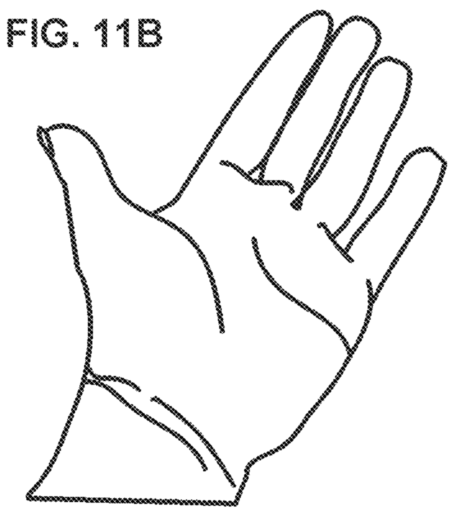

In step S1004, the control unit 211 determines whether or not a preliminary action of the tracking operation was performed as a preliminary operation determination unit. For example, the control unit 211 determines that the preliminary action of the tracking operation is performed when a shape of the hand, as illustrated in FIG. 11A, is recognized as a preliminary action of attempting to touch a CG object. FIG. 11A is an example of a still image, but the control unit 211 may determine whether or not the preliminary action was performed by a series of moving image within a predetermined time. For the determination algorithm, an algorithm to determine a match/mismatch with a pre-registered preliminary action may be used, or a model pre-trained by machine learning may be used. The pre-registered preliminary action need not always be a natural action of the user, but a predetermined action, such as turning the palm of the hand forward, as illustrated in FIG. 11B, may be registered in advance. However in this case, the control mode is changed by the preliminary action registered here, hence it is necessary to prevent the change of the control mode unintended by the user.

Therefore an action, by which the attempt to perform the tracking operation can be determined, as indicated in FIG. 11A, should be registered, or an intentional action that is easily distinguished from other actions (less likely to be mis-recognized), as indicated in FIG. 11B, should be registered. Processing advances to step S505 if it is determined that the preliminary action of the tracking operation is performed. Processing returns to step S1001 if it is determined that the preliminary action of the tracking operation is not performed.

In step S1005, the control unit 211 determines whether the preliminary action of the control operation is performed. Specifically, it is determined that the preliminary action of the control operation is performed when the finger of the user contacts the OTP included in the controller 120, when the OTP button is pressed, or when a button (not illustrated) other than the OTP is pressed. Processing advances to step S805 if it is determined that the preliminary action of the controller operation is performed. Processing returns to step S1001 if it is determined that the preliminary action of the controller operation is not performed. In the example described here, the control unit 211 determines whether or not the preliminary action of the controller operation is performed, but may determine whether the preliminary action of the ray operation is performed.

Although the left and right hands are not distinguished in the above description, the control unit 211 may determine whether the hand is left or right as a left/right determination unit. Then using this determination result, the control unit 211 may be able to select (set) the control mode independently for each of the left and right hands. To determine the left/right hand, the left and right hands may be registered in advance and the left/right hand may be determined using image recognition. Further, to determine the left/right hands, the controller may also register the information on which of the left and right hands the controller is worn in advance, and the left/right hand may be determined based on this information.

In this case, the control unit 211 determines whether to process the left hand or the right hand before step S1001. For example, the control unit 211 may first process a dominant hand of the user. The processing content in each step in the flow chart in FIG. 10 is interpreted as the processing for a determined processing target hand. The control unit 211 determines whether processing ended for both the left and right hands after step S506. Processing returns to step S1001 if the processing is not ended. Processing advances to step S507 if the processing is ended. In the case of returning to step S1001, the control unit 211 switches the processing target to the unprocessed hand of the left and right hands. Thereby repeatedly performing the processing in step S1001 for only one of the left and right hands is prevented. Needless to say, the control unit 211 may perform the processing for the left hand and the processing for the right hand in parallel by time division. In this case, the control unit 211 independently processes the flow in FIG. 10 for the left hand and the right hand.

In the above description, the phrase "processing advances to step S1 if A is B or more, and processing advances to step S2 if A is smaller (lower) than B" may be interpreted as "processing advances to step S1 if A is larger (higher) than B, and processing advances to step S2 if A is B or less". Further, "processing advances to step S1 if A is larger (higher) than B, and processing advances to step S2 if A is B or less" may be interpreted as "processing advances to step S1 if A is B or more, and processing advances to step S2 if A is smaller (lower) than B". In other words, as long as no inconsistency is created, "A or more" may be interpreted as "A or larger (higher; longer; more) than A", or may be interpreted as "larger (higher; longer; more) than A". Further, "A or less" may be interpreted as "A or smaller (lower; shorter; less) than A", or may be interpreted as "smaller (lower; shorter; less) than A". Furthermore, "larger (higher; longer; more) than A" may be interpreted as "A or more", and "smaller (lower; shorter; less) than A" may be interpreted as "A or less".

Whereas the present invention has been described with reference to the preferred embodiments thereof, the present invention is not limited to these specific embodiments, and include various forms within a scope not departing from the spirit of the invention. The above embodiments may be partially combined with each other as required.

Each functional unit of each embodiment (each modification) described above may or may not be independent hardware. Functions of two or more functional units may be implemented by common hardware. Each of a plurality of functions of one functional unit may be implemented by independent hardware respectively. Two or more functions of one functional unit may be implemented by common hardware. Each functional unit may or may not be implemented by such hardware as ASIC, FPGA and DSP. For example, a device may include a processor and a memory (storage medium) in which a control program is stored, and the functions of at least a part of the functional units included in the device may be implemented by the processor reading the control program from the memory, and executing the program.

According to the present invention, an electronic apparatus can be controlled in accordance with a control method desired by the user.

The various controls described above may or may not be performed by a single hardware (e.g., a processor or circuit). A plurality of hardware (e.g., a plurality of processors, a plurality of circuits, or a combination of one or more processors and one or more circuits) may share the processing to control the entire device.

The above processors are processors in the broadest sense and include both general purpose and specialized processors. The general-purpose processors include, for example, CPU (Central Processing Unit), MPU (Micro Processing Unit), and DSP (Digital Signal Processor). The specialized processors include, for example, GPU (Graphics Processing Unit), ASIC (Application Specific Integrated Circuit), PLD (Programmable Logic Device), etc. The programmable logic devices are, for example, FPGA (Field Programmable Gate Array), CPLD (Complex Programmable Logic Device), etc.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention is not limited to the embodiments described above, but may be changed and modified in various way without departing from the spirit and scope of the present invention. Therefore the following claims will be attached to disclose the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A control device for controlling an electronic apparatus, comprising:

one or more processors and/or circuitry configured to perform selection processing to select at least one of a first control mode and a second control mode as a control mode to control the electronic apparatus;

perform control processing to 1) control the electronic apparatus in accordance with a state of a hand of a user determined based on imaging by an imaging device in a case where the first control mode is selected in the selection processing, and 2) control the electronic apparatus in accordance with an operation of the user involving a physical contact with a specific operation member in a case where the second control mode is selected in the selection processing; and wherein:

in the selection processing, o the second control mode is selected as the control mode based on an operation on the specific operation member, and in the selection processing, the first control mode and the second control mode are concurrently selected as the control mode in a case where the hand of the user is included in a predetermined range based on imaging by the imaging device, the specific operation member is included in a controller, and the controller is wearable on the hand of the user.

2. The control device according to claim 1, wherein the one or more processors and/or circuitry is further configured to perform determination processing to determine whether or not the hand is included in the predetermined range, the first control mode is selected in the selection processing in a case where it is determined that the hand is included in the predetermined range, the second control mode is selected in the selection processing in a case where it is determined that the hand is not included in the predetermined range, and the predetermined range is an imaging range of the imaging device.

3. The control device according to claim 1, wherein in a case where the first control mode is selected in the selection processing, (1) the electronic apparatus is controlled in the control processing in accordance with a state of the hand determined based on the imaging and (2) the electronic apparatus is controlled in the control processing in accordance with the operation involving the physical contact of the user with the specific operation member.

4. The control device according to claim 1, wherein the second control mode is selected in the selection processing in a case where the user is in contact with the specific operation member, the first control mode is selected in the selection processing in a case where the user is not in contact with the specific operation member, and in a case where the second control mode is not selected, the electronic apparatus is controlled so as not to communicate with the specific operation member.

5. The control device according to claim 1, wherein the first control mode is either one of a third control mode and a fourth control mode, the electronic apparatus is controlled in the control processing in accordance with a position on an extended line in a direction pointed by the hand of the user in a case where the third control mode is selected in the selection processing, and the electronic apparatus is controlled in the control processing in accordance with a position of the hand of the user in a case where the fourth control mode is selected in the selection processing.

6. The control device according to claim 5, wherein in the case of selecting the first control mode, in the selection processing, the third control mode is selected as the first control mode in a case where an angle between a direction pointed by the hand of the user and the horizontal direction is smaller than a second threshold, and in the selection processing, the fourth control mode is selected as the first control mode in a case where an angle between a direction pointed by the hand of the user and the horizontal direction is larger than the second threshold.

7. The control device according to claim 1, wherein the controller is wearable on a finger of the user.

8. The control device according to claim 1, wherein the one or more processors and/or circuitry is further configured to perform left/right determination processing to determine the left or right hand of a user, and in the selection processing, the first control mode is selected for one of the left and right hands of the user, and the second control mode is selected for the other hand, utilizing a determination result of the left/right determination processing.

9. The control device according to claim 1, wherein in a case where a predetermined change of the attitude of the imaging device is detected, a current control mode is maintained in the selection processing.

10. A method for controlling an electronic apparatus, comprising:

a selection step of selecting at least one of a first control mode and a second control mode as a control mode to control the electronic apparatus;

a control step of 1) controlling the electronic apparatus in accordance with a state of a hand of a user determined based on imaging by an imaging device in a case where the first control mode is selected in the selection step, and 2) controlling the electronic apparatus in accordance with an operation of the user, involving a physical contact with a specific operation member, in a case where the second control mode is selected in the selection step; and wherein:

in the selection step the second control mode is selected as the control mode based on an operation on the specific operation member, in the selection step, the first control mode and the second control mode are concurrently selected as the control mode in a case where the hand of the user is included in a predetermined range based on imaging by the imaging device, the specific operation member is included in a controller, and the controller is wearable on the hand of the user.

11. A non-transitory computer readable medium that stores a program, wherein the program causes a computer to execute a method for controlling an electronic apparatus, the method comprising:

a selection step of selecting at least one of a first control mode and a second control mode as a control mode to control the electronic apparatus;

a control step of 1) controlling the electronic apparatus in accordance with a state of a hand of a user determined based on imaging by an imaging device in a case where the first control mode is selected in the selection step, and 2) controlling the electronic apparatus in accordance with an operation of the user, involving a physical contact with a specific operation member, in a case where the second control mode is selected in the selection step; and wherein:

in the selection step, the second control mode is selected as the control mode, based on an operation on the specific operation member, and in the selection step, the first control mode and the second control mode are concurrently selected as the control mode in a case where the hand of the user is included in a predetermined range based on imaging by the imaging device, the specific operation member is included in a controller, and the controller is wearable on the hand of the user.

12. The control device according to claim 6, wherein the second threshold is changed to a smaller value the more the user bends forward.

13. The control device according to claim 1, wherein in the selection processing, a fifth control mode for controlling the electronic device in accordance with a number of times of blinking of the eyes in a predetermined time is selected as the control mode in a case where both eyes of the user are captured, and in the selection processing, the second control mode is selected as the control mode in a case where both eyes of the user are not captured.

14. The control device according to claim 1, wherein in the selection processing, the second control mode is selected in accordance with the specific operation member being operated by the user.

15. The control device according to claim 14, wherein the specific operation member includes a first operation member and a second operation member, in the selection processing, the control mode is changed in a specific sequence based on the first operation member being operated, and in the selection processing, the control mode is changed in an opposite sequence to the specific sequence based on the second operation member being operated.

16. A control device for controlling an electronic apparatus, comprising:

one or more processors and/or circuitry configured to perform selection processing to select at least one of a first control mode and a second control mode as a control mode to control the electronic apparatus;

perform control processing to 1) control the electronic apparatus in accordance with a state of a hand of a user determined based on imaging by an imaging device in a case where the first control mode is selected in the selection processing, and 2) control the electronic apparatus in accordance with an operation of the user involving a physical contact with a specific operation member in a case where the second control mode is selected in the selection processing; and perform preliminary action determination processing to determine whether a preliminary action is performed by the user and to determine whether the preliminary action corresponds to a first preliminary action or a second preliminary action, wherein:

the first control mode is one of a third control mode and a fourth control mode, in the selection processing, the second control mode and the third control mode are concurrently selected in a case where, in the preliminary action determination processing, the second preliminary action is determined to be performed by the user, and the fourth control mode is selected in a case where, in the preliminary action determination processing, the first preliminary action is determined to be performed by the user, the first preliminary action is a preliminary action of attempting to touch a CG object and is not an action of touching a CG object, the second preliminary action is an action of contacting the specific operation member, the electronic apparatus is controlled in the control processing in accordance with a position on an extended line in a direction pointed by the hand of the user in a case where the third control mode is selected in the selection processing, and the electronic apparatus is controlled in the control processing in accordance with a position of the hand of the user in a case where the fourth control mode is selected in the selection processing.

17. The control device according to claim 16, wherein one of the third control mode and the fourth control mode is selected for a first hand of the user, and the second control mode is selected for a second hand, the specific operation member being worn on the second hand and operated by the first hand of the user.

18. The control device according to claim 16, wherein in a case where it is not determined in the preliminary action determination process that the preliminary action is performed, even if the hand is included in an imaging range of the imaging device, the control mode is not switched.

19. The control device according to claim 1, wherein the first control mode is one of a third control mode and a fourth control mode, and the second control mode is concurrently selected with one of the third control mode and the fourth control mode based on the state of the hand of the user.

20. The control device according to claim 19, wherein in a case that the second control mode is concurrently selected with one of the third control mode and the fourth control mode, the control processing in the second control mode provides a finer adjustment of control of the electronic apparatus than an adjustment obtained through the one of the third control mode or the fourth control mode.

21. The control device according to claim 16, wherein in a case where the second control mode and the third control mode are concurrently selected, even if the specific operation member is not operated and the first preliminary action is performed, if a predetermined change of the attitude of the imaging device is detected, switching to the first control mode is not performed, and the second control mode and the third control mode are maintained.

22. The control device according to claim 16, wherein the first preliminary action and the second preliminary action are registered in advance in association with respective control modes.

* * * * *